(12) United States Patent
Van Erlach et al.

(10) Patent No.: US 11,941,582 B2
(45) Date of Patent: *Mar. 26, 2024

(54) SYSTEMS AND COMPUTER-IMPLEMENTED METHODS FOR INVENTORY MANAGEMENT

(71) Applicant: FabFitFun, Inc., Los Angeles, CA (US)

(72) Inventors: Julian Van Erlach, Walnut, CA (US); Ben Chandler, Riverdale, UT (US); Nathan Goodrich, Arcadia, CA (US); Mark Gavin, Arcadia, CA (US)

(73) Assignee: FABFITFUN, INC., Los Angeles, CA (US)

( * ) Notice: Subject to any disclaimer, the term of this patent is extended or adjusted under 35 U.S.C. 154(b) by 61 days.

This patent is subject to a terminal disclaimer.

(21) Appl. No.: 17/709,828

(22) Filed: Mar. 31, 2022

(65) Prior Publication Data

US 2023/0084790 A1    Mar. 16, 2023

Related U.S. Application Data

(63) Continuation of application No. 17/540,005, filed on Dec. 1, 2021, now Pat. No. 11,334,846.

(60) Provisional application No. 63/244,596, filed on Sep. 15, 2021.

(51) Int. Cl.
*G06Q 10/087* (2023.01)
*G06Q 10/0631* (2023.01)

(52) U.S. Cl.
CPC ..... *G06Q 10/087* (2013.01); *G06Q 10/06315* (2013.01)

(58) Field of Classification Search
CPC .......... G06Q 10/087; G06Q 10/06315
See application file for complete search history.

(56) References Cited

U.S. PATENT DOCUMENTS

| 7,243,001 | B2 | 7/2007 | Janert et al. |
| 7,464,873 | B2 * | 12/2008 | Spencer ............... G06Q 10/087 705/28 |
| 7,680,691 | B2 | 3/2010 | Kimball et al. |
| 7,826,920 | B2 | 11/2010 | Stevens et al. |

(Continued)

FOREIGN PATENT DOCUMENTS

| WO | WO 2019/088786 A1 | 5/2019 |
| WO | WO 2020/148795 A1 | 7/2020 |
| WO | WO 2020/195765 A1 | 10/2020 |

OTHER PUBLICATIONS

Expiration dates on FBA products—Amazon Seller Central, https://sellercentral.amazon.com/gp/help/external/G201003420?language=en_US.

(Continued)

*Primary Examiner* — Paul Danneman
(74) *Attorney, Agent, or Firm* — Orrick, Herrington & Sutcliffe LLP

(57) ABSTRACT

Disclosed are systems and methods for inventory management based on effective days to expiry accounting for serving days of an expiring item and inventory days of supply. The disclosed system provides dynamic and automated inventory management which provides a desirable solution for a wide range of inventory applications, such as optimizing order fulfillment, inventory/receiving management, pricing/promotions determination, and store inventory management.

20 Claims, 12 Drawing Sheets

(56) References Cited

U.S. PATENT DOCUMENTS

| | | |
|---|---|---|
| 8,447,665 B1 | 5/2013 | Schoenharl et al. |
| 9,547,851 B2 | 6/2017 | Brown |
| 9,733,633 B2 | 8/2017 | Wickham et al. |
| 9,767,507 B2 | 9/2017 | Foster et al. |
| 10,589,931 B2 | 3/2020 | Jarvis et al. |
| 10,997,550 B1 | 5/2021 | Rehn et al. |
| 11,334,846 B1 * | 5/2022 | Van Erlach .......... G06Q 10/087 |
| 2008/0172253 A1 | 7/2008 | Chung et al. |
| 2009/0095813 A1 | 4/2009 | Chang et al. |
| 2010/0148958 A1 | 6/2010 | Chen |
| 2013/0138656 A1 | 5/2013 | Wheaton |
| 2015/0307278 A1 | 10/2015 | Wickham et al. |
| 2019/0171997 A1 | 6/2019 | Roach |

OTHER PUBLICATIONS

International Search Report and Written Opinion, Application No. PCT/US2022/022812, dated May 16, 2022.

\* cited by examiner

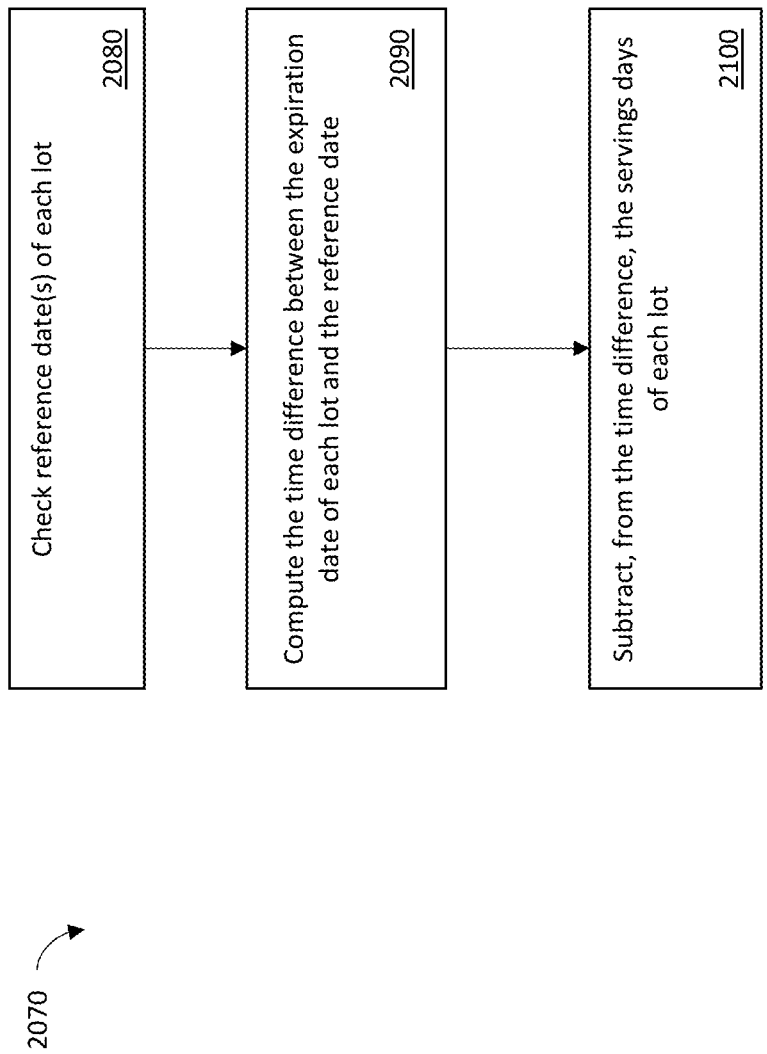

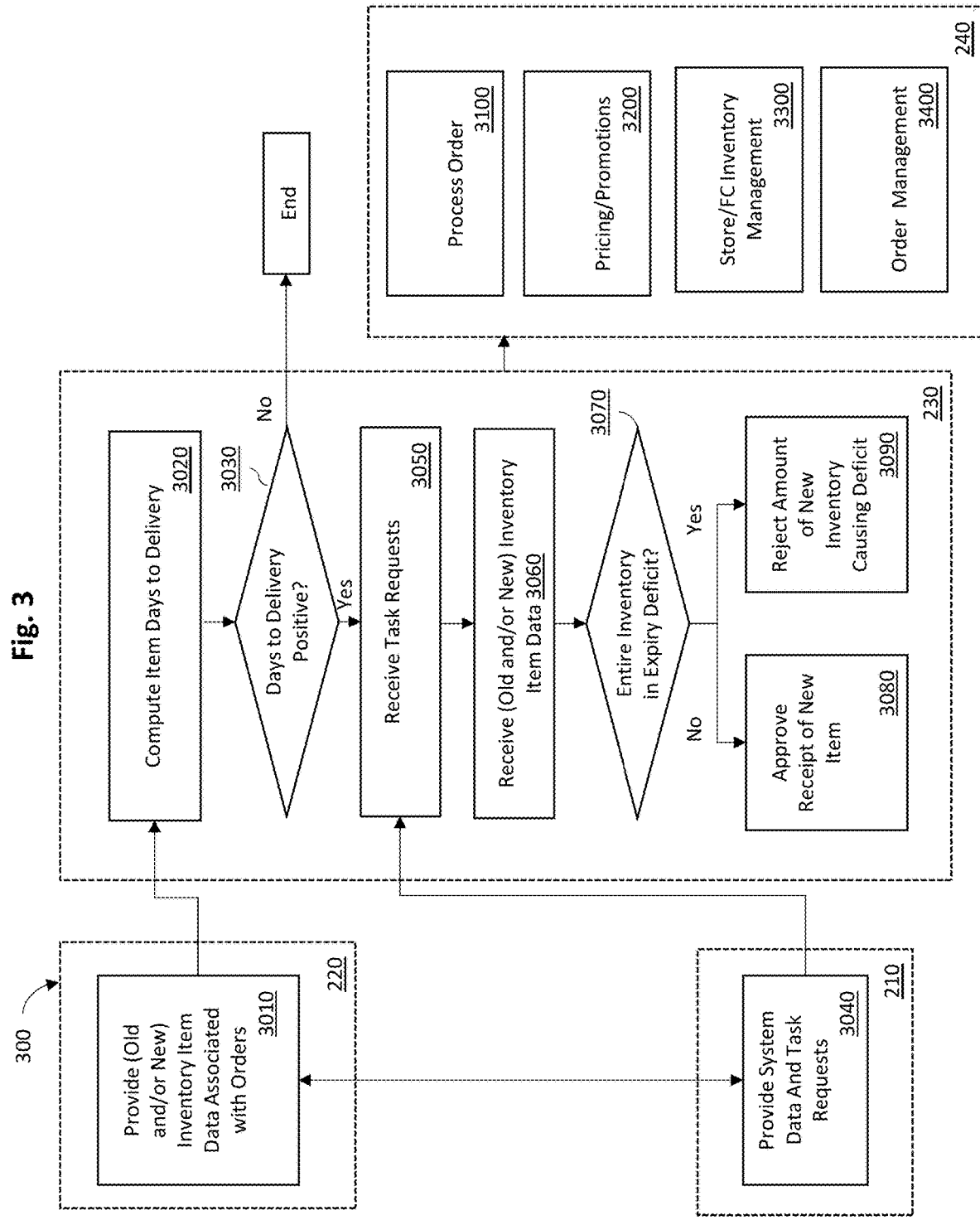

SYSTEMS AND COMPUTER-IMPLEMENTED METHODS FOR INVENTORY MANAGEMENT

CROSS-REFERENCE TO RELATED APPLICATIONS

This application is a continuation of and claims priority to U.S. patent application Ser. No. 17/540,005, filed Dec. 1, 2021, which application claims priority to U.S. Provisional Patent Application Ser. No. 63/244,596, filed on Sep. 15, 2021, the contents of which are incorporated herein by reference in their entirety and for all purposes.

FIELD

The present disclosure generally relates to inventory management. More specifically, but not exclusively, the present disclosure describes computerized systems and methods for improved inventory management based on expiration dates.

BACKGROUND

A fast-growing distribution industry provides incentives for distributors to improve warehouse systems to better manage inventories. Inventory management is a process of tracking inventory levels, orders, sales, and deliveries to avoid product overstock, outages, and customer disappointment due to receiving items that have expired or may partially expire by the time they are consumed.

Conventional systems track inventory levels and indicate to distributors when the stock is low and perform tasks accordingly. For example, some current warehouse management systems ("WMS") or other inventory management systems allow for item inventory tracking based on expiration or receipt date on a first in first out ("FIFO") and/or first expiring first out ("FEFO") basis. Some inventory management systems use Radio Frequency Identification ("RFID") tags. In one example, an RFID tag on a smart refrigerator can be scanned to generate a list of expiring food items in a smart refrigerator by reading a loyalty program card or a RFID dongle, such as described in U.S. Pat. No. 9,547,851. Another conventional system tracks an RFID tag encoded with the expiration date of a given food product, such as described in U.S. Pat. No. 7,680,691. Unfortunately, these systems require the users to scan the storage containers on a regular basis.

Nevertheless, even if systems automate some steps, these conventional approaches still rely on only the expiration dates of the products. For example, some conventional systems offer meal planning suggestions based on inventory levels or expiration dates (U.S. Patent Publication No. 2013/0138656A1), remove expiring items from inventory (U.S. Pat. No. 8,447,665), provide alerts of expiring items (U.S. Patent Publication No. 2019/0171997A1), set a countdown on a device installed on a refrigerator for expiring food (U.S. Patent Publication No. 2010/0148958A1), or suggest a particular stored good in response to a user's requested recipe (U.S. Patent Publication No. 2009/0095813A1). These systems do not consider other factors such as the days of supply of inventory and the required servings for the products, which usually results in inaccurate estimation of the effective expiration days of the products (or "effective expiry")—the difference of days to expiry and serving days (other units of time such as months may also be used)—and untimely replenishment of the inventory.

Even if some online retailers add extra days to the days to expiration of products for storage and shipping, this method, however, adds extra days only at the time of check-in to the fulfillment center ("FC") rather than during the entire inventory management process. And the calculation of the days to expiry prior to shipping is not automated, merely adding an arbitrary number of days to the days to expiration without accounting for days of supply of the inventory and serving days of the products.

As a further disadvantage, these conventional systems simply pick an item from an inventory and ship it to a customer who places an order so long as the item has not expired according to the manufacturing expiration date. Customers reject or complain about shipments that contain items that have not expired but some of the servings have passed the expiration date or will pass the expiration date by the time the items are fully consumed.

In view of the foregoing, a need exists for an improved system and method for inventory management to overcome the aforementioned obstacles and deficiencies of the conventional systems.

BRIEF DESCRIPTION OF THE DRAWINGS

FIG. 2C is an exemplary data flow diagram illustrating one embodiment of the process for computing an effective expiry of the process for inventory management of FIG. 2B.

FIG. 3 is an exemplary block diagram illustrating another embodiment of the inventory management system of FIG. 2A.

Figure 1:
FIG. 1 is an exemplary diagram illustrating one embodiment of a consumable item.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION

FIG. 1 is an illustrative example of a consumable item with servings. In some embodiments, a consumable item is defined by attributes such as an expiration date or expiry, a lot number—a location of the inventory that the item is stored in, a quantity such as the number of containers, a total servings per container, a serving unit, a recommended daily dose, and a recommended days of servings or serving days. In some embodiments, the recommended days of servings of the consumable item is the total serving units per container divided by the recommended daily dose of the item. In the illustrative example of FIG. 1, the total serving units are 50 capsules, the recommended daily dose is 2 capsules, resulting in the recommended days of servings of 25 days (50 capsules divided by 2 capsules/day). The date of expiry is not shown in this illustrative example.

The present disclosure describes a number of computerized methods and systems for inventory management. The computer-implemented inventory management system and method described herein cure the defects of the currently available warehouse systems by managing inventory based on at least the expiration dates of products, days of supply of inventory, and required servings of products. The inventory management system uses an automated computer system to manage inventory by effective expiry based on the expiration dates of products, e.g., as shown on the manufacturing label (manufacturing expiration date), and serving days of the products, which provide desirable results in inventory management including but not limited to optimizing Order Fulfillment, Inventory/Receiving Management, Order Management, Pricing/Promotions Determination, and Store Inventory Management. These results can be achieved, according to some embodiments disclosed herein, by an inventory management system 200 as illustrated in FIGS. 2A-9B and as discussed below.

Figure 2A:
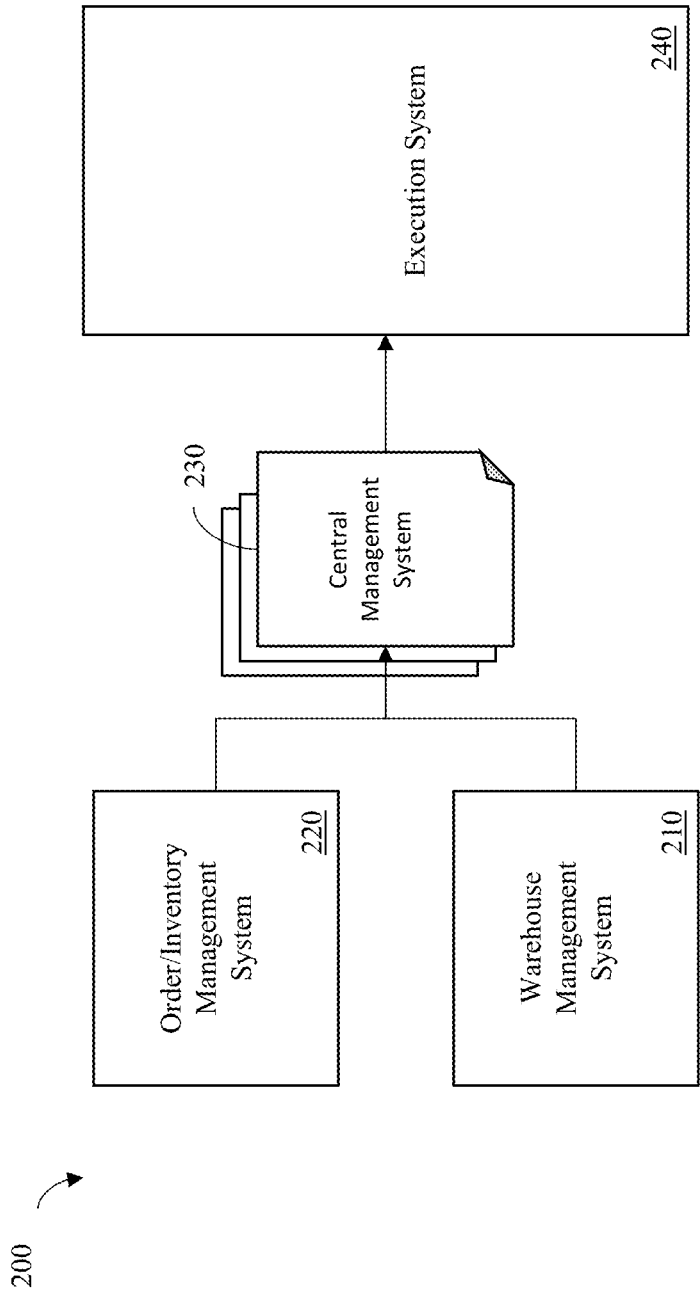
FIG. 2A is an exemplary top-level block diagram illustrating one embodiment of an inventory management system.

Turning to FIG. 2A, the inventory management system 200 includes a Warehouse Management System ("WMS") 210, an Inventory or Order Management System ("IOMS" or "OIMS") 220, a Central Management System ("CMS") 230, and an Execution System 240. The inventory management system 200 can also include an enterprise resource planning ("ERP") system, a supply chain management system, or other host systems for better warehouse controls as desired. For example, additional warehouse control systems can be included to satisfy differences in warehouse and/or order sizes. Additionally and/or alternatively, although the WMS 210 and the ERP system are described as distinct modules, the WMS 210 and the ERP system can comprise a single module for performing warehouse functions.

The WMS 210 feeds warehouse/inventory system data to the CMS 230. In some embodiments, the warehouse/inventory system data is associated with a selected order, including all items matching ordered items, lots, expiration dates of the lots, inventory quantities of each item/lot combination, pick locations of each item/lot combination, and inventory days of sales based on sales rate or forecasts and on order quantities.

The OIMS 220 includes a memory that stores and feeds inventory item data to the CMS 230. In some embodiments, the memory manages a data structure, such as a data structure 250 described with reference to FIG. 2D. In some embodiments, the inventory item data includes but not limited to the attributes discussed in FIG. 1.

The WMS 210 and/or the OIMS 220 receive data including an inventory item's attributes externally. In some embodiments, the WMS 210 and/or the OIMS 220 automatically receive data through a scan, an RFID tag, and/or an electronic data interchange ("EDI"). Other data that the WMS 210 and/or the OIMS 220 receive can include data of an inventory's attributes including but not limited to item sales rates, sales forecasts, and item price and cost.

The OIMS 220 identifies and manages inventory items by factors such as manufacturing expiration dates. In some embodiments, the OIMS 220 identifies inventory items based on an order and indicates to the WMS 210 the identified items that are associated with the manufacturing expiration dates.

The CMS 230 includes one or more processors for executing an Order Fulfillment process, an Inventory/Receiving Management process, an Order Management process, a Pricing/Promotions Determination process, and a Store Inventory Management process. In a preferred embodiment, these processes can be embodied on a computer tangible medium, such as a computer program product that can be executed by the one or more processors. Exemplary computer programs include C#, Oracle SQL, PL/SQL, Java, T-SQL, Microsoft.net, and so on.

The CMS 230 further includes at least one memory for storing the computer program. Based on the data received from the WMS 210 and the OIMS 220, the CMS 230 calculates effective expiry of the inventory items associated with the order and to instruct the Execution System 240 to perform tasks including but not limited to Order Fulfillment, Inventory/Receiving Management, Order Management, Pricing/Promotions Determination, and Store Inventory Management based on at least associating the inventory items with the calculated effective expiry.

Based on the calculated effective expiry, the CMS 230 further instructs the Execution System 240 to perform tasks related to inventory management. The Execution System 240 can include several functional modules:

A pick module (e.g., a Pick/Pack module 8230 in FIG. 8) after the CMS 230 has determined that a lot of an item satisfies business rules for picking, A receiving module (e.g., A Receiving module 8210 in FIG. 8), A pricing module 3200 (FIG. 3) or a Marketing/Pricing System 8500 (FIG. 8), A store inventory management module 3300 (FIG. 3) or an Inventory Management/Audit/Adjustments 8250 (FIG. 8), and A purchasing module (e.g., a Purchasing module 8300 (FIG. 8)).

The functions of the Execution Systems 240 that the CMS 230 instructs the Execution Systems 240 to perform are described as follows:

In some embodiments, the CMS 230, for each item with days to expiry and serving days, computes the effective expiry—the difference between days to expiry and serving days (other units of time such as months may also be used). As a non-limiting example, if an item has 150 days to expiry and 180 serving days, the effective expiration days is −30 days. Exemplary ways to compute the effective expiry by the CMS 230 are further discussed in connection with Steps 3020-3040 of FIG. 3.

The effective expiration data can be periodically and/or continuously updated for all items. The CMS 230 acts as the filter between the OIMS 220, the WMS 210 and the Execution System 240. The OIMS 220 receives a customer order including an item of a quantity, which is sent to the CMS 230 and checked against expiry and serving days criteria, as well as potential time to be received by a customer. The item/lot combinations which show a negative balance may be blocked from picking and shipping to the customer. For example, if the time to expiry minus serving days and minus time to customer receipt is less than a predetermined threshold such as 0, the item may be marked to not be picked or shipped.

When the item/lot combinations show a positive balance, where time to expiry minus serving days and minus time to customer receipt is greater than a predetermined variable such as 0. The ordered item of a quantity is further routed to the Pick module of the Execution System 240, which finds the location(s) and quantity to be picked and issues electronic pick instructions for robots or human pickers through electronic means, such as wireless devices or interfaces. In some embodiments, the electronic pick instructions are transmitted through a communication protocol, such as TCP/IP. Item/lot combinations with the smallest positive values may be picked and shipped first (which may come from different lots that meet the criteria if the inventory of a first desired lot is insufficient).

In some embodiments, the CMS 230 includes a communication module (not shown) that receives data relating to attributes of selectively received new items and stores the received data in the memory of the CMS 230. The processors of the CMS 230 compare the received quantity and the effective expiry of the new items with those of the same type of items existing in the inventory. In some embodiments, the existing items in the inventory have a different quantity and expire earlier than the new items. In some embodiments, the newly received items expire earlier than the existing items. The processors calculate the effective expiry or the days of sales for the entire inventory, which is the combination of the new items and the existing items in the inventory.

The rules for calculating the days of sales of the entire inventory may be pre-defined. In some embodiments, the days of sales of the entire inventory is a function of inventory item attributes that the OIMS 220 receives, including but not limited to the quantity and/or the effective expiry of the new and existing items. For example, an item of lot A has 100 units of inventory, 180 days to expiration, sales forecast of 1 unit/day, and 120 days of servings. This means that after 60 days (180 days to expiration–120 servings day), at daily sales rate of 1 unit, 40 units (100-60 units) of inventory of lot A will begin expiring within the serving days of the item. Suppose another 160 units are received for lot B with 220 days to expiration. Lot B items have 100 serving days (220–120 serving days) before they experience expiration within that lot. However, inventory is now 260 units (100+160 units) with 260 days of sales. This means that all of the items in lot B will begin seeing expiration of serving days within the days to expiration of the lot. Therefore, the CMS 230 rejects this shipment and returns it to vendor and orders items with enough time to expiration so that all sales days of inventory still result in positive serving days vs time to expiration. In some embodiments, a vendor system, such as a Vendor System 8400 in FIG. 8, returns shipment to vendors based on data received and stored on the vendor system.

If the difference between the days of sales of the entire inventory and the days to expiration of the new items (the days of sales of entire inventory–days to expiration of the new items) is a negative number, an expiry deficit occurs. The expiry deficit is due to receipt of a portion of the new items with a negative expiry. When the expiry deficit occurs, the CMS 230 rejects that portion of the new items at receiving and to return the same to the vendor (FIG. 3, Steps 3060-3090). In some embodiments, the above calculation is in accordance with pre-defined business rules as discussed below.

Figure 8:
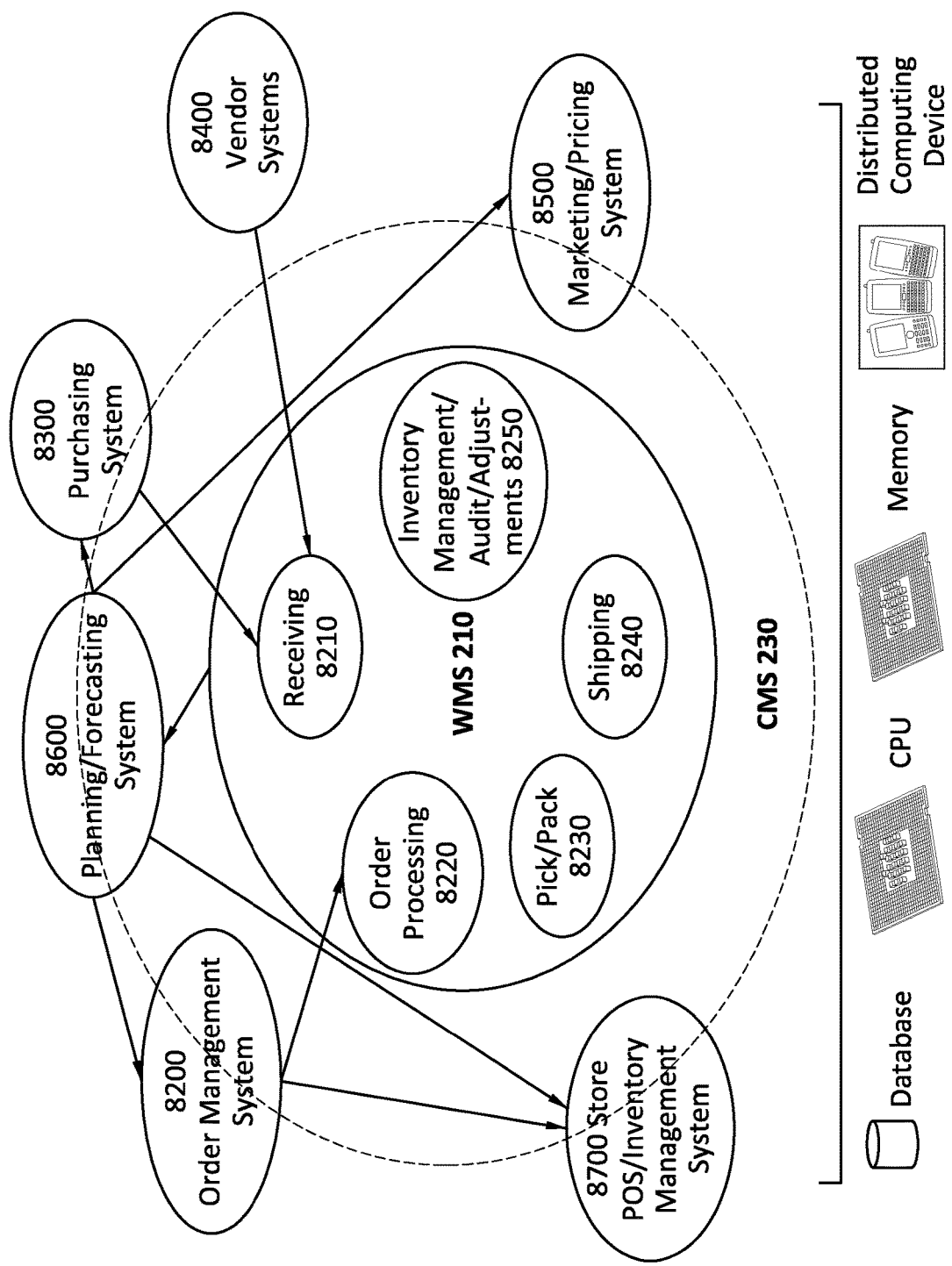
FIG. 8 is an exemplary functional block diagram illustrating one embodiment of the arrangement of the inventory management system of FIG. 2A.

In some embodiments, the process of selectively receiving new items can include the CMS 230 receiving an item, a lot, a quantity and an expiration date from a receiving module in the WMS 210, such as the Receiving module 8210 shown in FIG. 8. Thereupon, the CMS 230 may obtain a forecast sales rate through a future time from a forecasting and planning module such as a Planning/Forecasting System 8600 of FIG. 8 in operative connection with the WMS 210, wherein the CMS 230 determines how long it will take to sell the combined existing inventory and newly received inventory. If the CMS 230 determines that any of the received items or lots cause the entire inventory to have an expiry deficit (the calculated days of sales of the entire inventory is a negative number as discussed above), the CMS 230 electronically instructs the WMS 210 receiving module to reject all or part of the received inventory.

In some embodiments, the CMS 230 cooperates with an ordering module of the WMS 210, such as a Process Order module 3100 and/or an Order Management module 3400 (shown in FIG. 3) or an Order Processing module 8220 and/or an Order Management System module 8200 (shown in FIG. 8). In some embodiments, the CMS 230 provides specific minimum expiration dates and quantities to the ordering system. The minimum expiration dates may be determined by expiration date at the time of receipt of items or lots at a particular date or date range. Thus, the CMS 230 assures that no portion of serving days of future receipts will be in deficit according to a sales forecast.

In some embodiments, the processors of the CMS 230 compare days of supply (e.g., inventory quantity and/or sales forecast) to the effective expiry. As a non-limiting example, if there are 60 days of supply, but after 30 days, 50% of the inventory will have a negative effective expiry based on serving days, the CMS 230 instructs that a discount be offered aiming for accelerating sales (the Pricing/Promotion module 3200 in FIG. 3 or the Marketing/Pricing System 8500 in FIG. 8). In this embodiment, the CMS 230 continuously monitors inventory in terms of days of supply, time to expiry of each lot, and computes inventory quantities of lots based on forecasts that indicate expiry risk of remaining serving days. If there is an expiry risk, the CMS 230 alerts or instructs a pricing and promotions module (such as the Marketing/Pricing System 8500 of FIG. 8) that a promotion event should be considered to increase the rate of sale of at-risk inventory.

In some embodiments, the processors of the CMS 230 instruct a Store Inventory Management System to issue discounts to items in stock which are already in an expiry deficit or are going to be in an expiry deficit based on the calculated effective expiry (the Store/FC Inventory Management module 3300 in FIG. 3). The CMS 230 alerts users or store agents to display such items more visibly.

The described functions that the CMS 230 instructs the Store Inventory Management System to perform advantageously reduce the risk that a company may face across multiple distribution centers and stores when numerous items are in the inventory.

During the execution of the Order Fulfillment process, the Inventory/Receiving Management process, the Order Management process, the Pricing/Promotions Determination process, and the Store Inventory Management process, the CMS 230 determines the effective expiry based on manufacturing expiration dates and the serving days of an item. In some embodiments, the CMS 230 also produces progress reports for the tasks it performs, generates alerts upon at least fulfillment of order or determination of expiry deficit, and/or calculates and issues discounts to items in stock as necessary. Although shown and described as the CMS 230 for exemplary purposes only, any additional automated system can be used with the inventory management system 200 as desired.

Figure 2B:
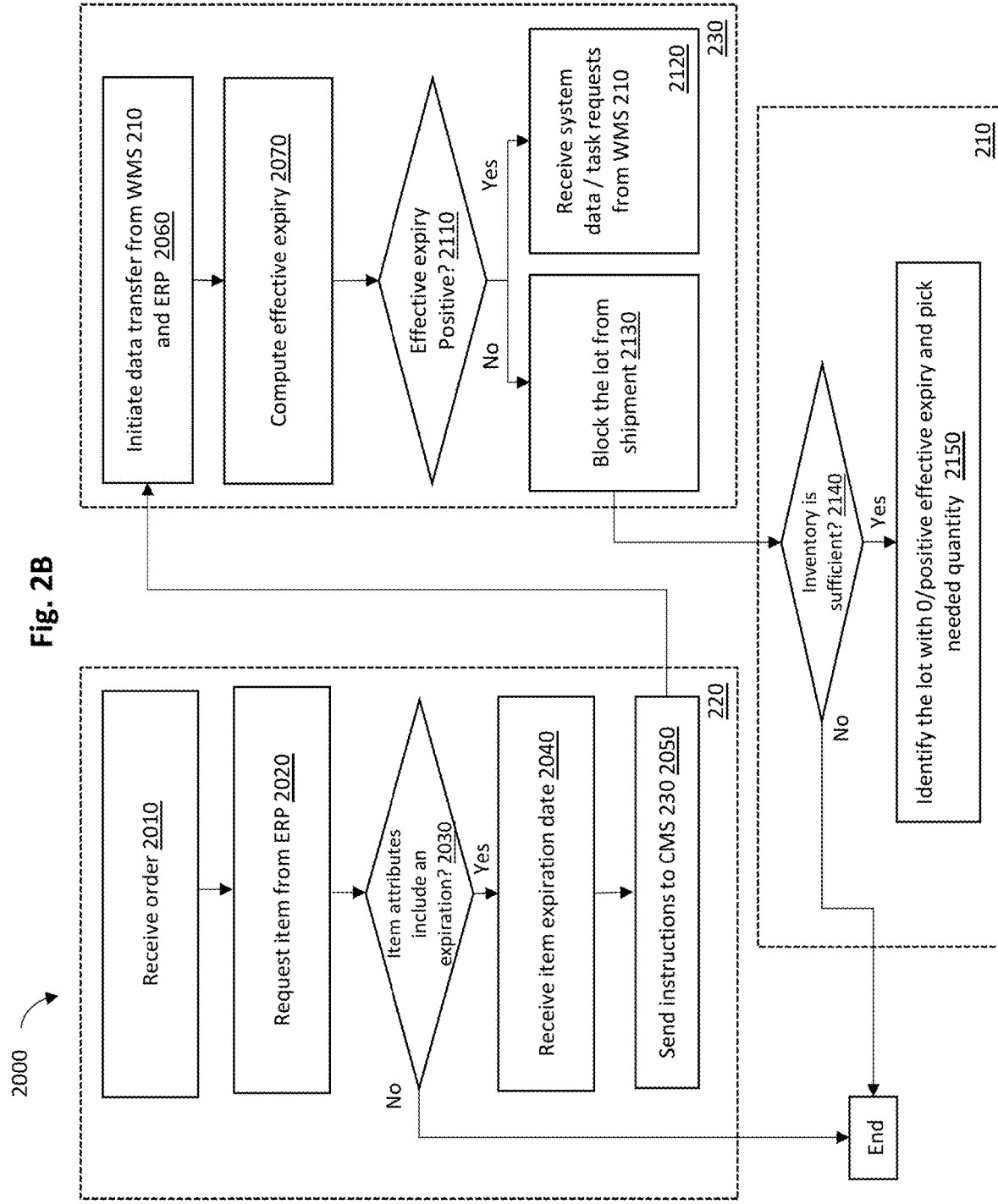
FIG. 2B is an exemplary data flow diagram illustrating one embodiment of an exemplary process for inventory management using the inventory management system of FIG. 2A.

FIG. 2B is an exemplary data flow diagram illustrating one embodiment of a computer-implemented method 2000 for inventory management using the inventory management system 200 of FIG. 2A. In one aspect, at step 2010, the OIMS 220 receives an order comprising an item ID and a quantity. By way of example, the order can represent a customer or store inventory order. Upon receiving the order, at step 2020, a program module is executed in the memory of the OIMS 220 to send a message through a communications protocol to an ERP. The message includes a request for the ERP to cross reference to determine if the item ID has a lot and expires. In one embodiment, the ERP cross references the item ID to an item master file containing item attributes.

At step 2030, the ERP determines if the item attributes defines an expiration date of the item. If the item attributes do not define an expiration date, the program module of the OIMS 220 ends the process 2000. If the item attributes define an expiration date, at step 2040, the OIMS 220 receives a message from the ERP program with the expiration date. Thereupon, at step 2050, the program module of the OIMS 220 sends instructions to the CMS 230 that include the item ID, quantity, and expiration date.

At step 2060, an administration program within the CMS 230 receives the message from the OIMS 220 and executes another program that sends a message through a communications protocol to the WMS 210 requesting available item ID-associated information such as lots, expiration dates and quantities for each lot; and a message to the ERP requesting the consumption time and/or recommended serving days of the item or lot.

At step 2070, upon receiving from the WMS 210 the item ID-associated lot information and serving days from the ERP, the administration program of the CMS 230 triggers the CMS 230 to compute an effective expiry of the item. With reference to FIG. 2C, one embodiment of the process 2070 for computing the effective expiry of the item is shown. For each lot, the computation program module performs the following process: a) at step 2080, checking the desired reference date which may be the current date, an estimated order ship date, an estimated order delivery date or other reference date; b) at step 2090, computing the time difference between the expiration date of each lot and the reference date; and c) at step 2100, further subtracting the serving days of the item.

As an example, the reference date is the expected order delivery date, which is ten days from the current date. The expiration date is one hundred twenty days from the order delivery date. The serving days may be one hundred fifty days. A computation of the effective expiry is minus thirty (−30) days of servings from the expected delivery date.

Returning to FIG. 2B, at step 2110, the administration program of the CMS 230 determines if the effective expiry (serving days from the expected delivery) is positive. If the effective expiry is positive, at step 2120, the CMS 230 receives system data and task requests from the WMS 210, which assigns items to orders. If the effective expiry is not positive (negative), at step 2130, a program module of the CMS 230 blocks the lot or item from shipment and further instructs the WMS 210 to determine if the inventory is sufficient.

The WMS 210 determines if the inventory is sufficient at step 2140. If the inventory is not sufficient, the WMS 210 ends the process.

If the inventory is sufficient, at step 2150, the WMS 210 identifies the first expiring lot that has 0 or positive effective expiry (serving days from the expected delivery date), and picks a quantity from the first identified lot. In some embodiments, the first identified lot is the earliest expiring lot that has the smallest positive effective expiry. If the first identified lot does not have sufficient quantity to meet the order quantity for the item, the WMS 210 identifies a next lot that also has zero or positive serving days and pick the additional needed quantity from the next identified lot based on the instruction. In some embodiments, the next lot is the next earliest expiring lot that has the second smallest positive effective expiry. The WMS 210 repeats the above process at step 2150.

Figure 2D:
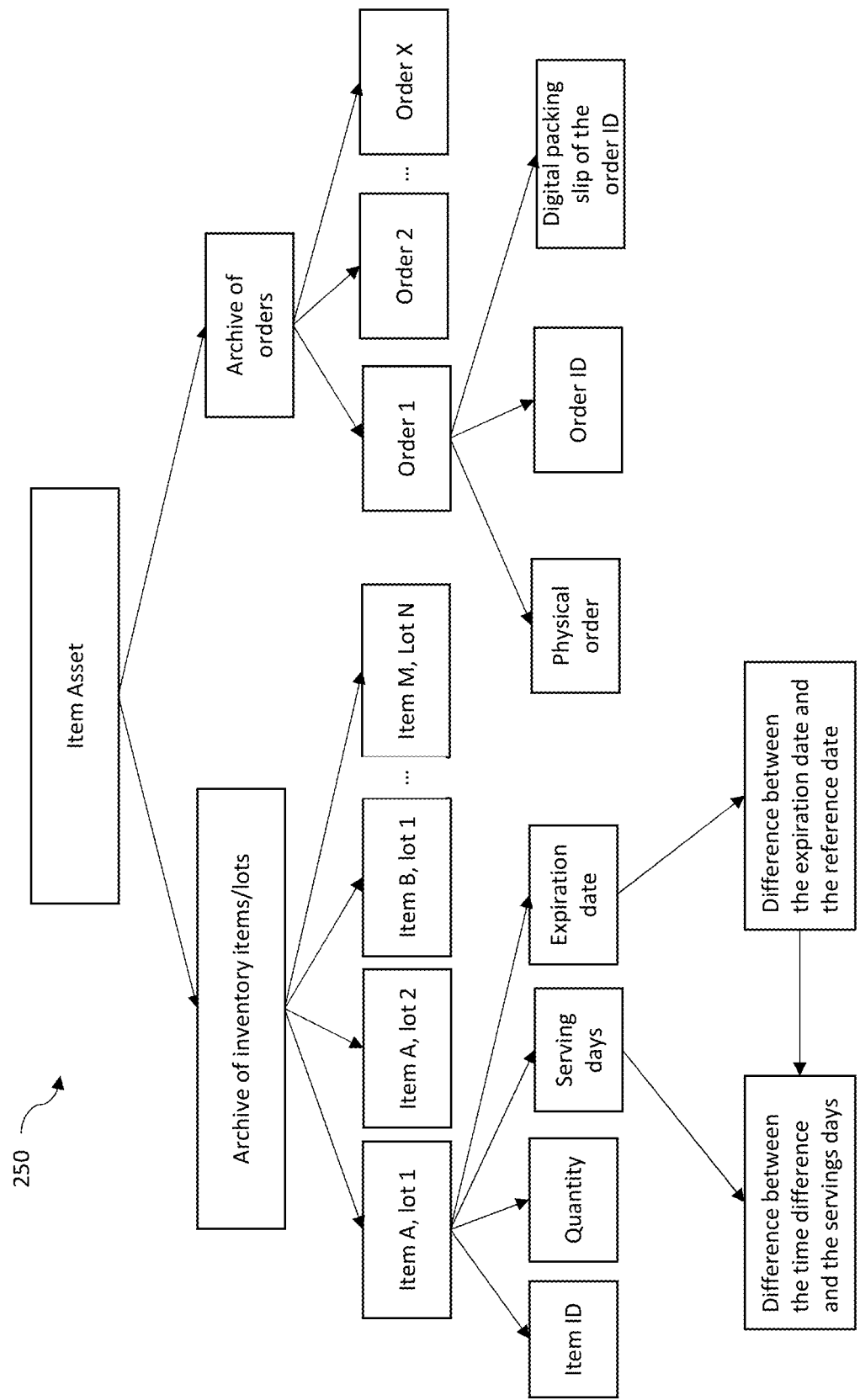
FIG. 2D is an exemplary block diagram illustrating one embodiment of the resulting data structure created by the CMS using the exemplary process for inventory management of FIG. 2B.

In some embodiments, the OIMS 220 may further associate the data structure 250 created and updated by the computer program product of CMS 230. FIG. 2D is an exemplary block diagram illustrating the data structure 250. In some embodiments, the data structure 250 facilitates shipping lots or items with positive expected serving days from the expected delivery date. The CMS 230 instructs the shipment of each of these lots or items to a customer or store according to a physical order ID and a physical or digital packing slip. In some embodiments, the WMS 210 or the ERP also maintains the data structure 250 in the memory performing the order archive function.

As shown, the data structure 250 comprises an archive of inventory items/lots and an archive of orders. The archive of inventory items/lots comprises, for each item/lot, an item ID, quantity, serving days, expiration date.

In some embodiments, the computer program product of the CMS 230 associates the archive of inventory items/lots with the archive of orders. In some embodiments, the archive of orders comprises, for each customer/store order, an order ID, a physical order, and the digital packing slip of the order ID.

In some embodiments, the computer program product of CMS 230 encodes the data structure 250 a value comprising the result of subtracting from a lot expiration date, a reference date, such as the difference between the expiration date of each lot and a reference date, the difference between the time difference and the serving days. In some embodiments, the difference is computed by following steps 2080-2100 of FIG. 2B. In some embodiments, the data structure 250 includes an encoded value comprising the result of subtracting from an order receipt date by a recipient and/or further subtracting the consumption days of the item. The computer program product of CMS 230 creates and continuously updates a new data structure 250 at a predetermined frequency (e.g., after each time or day).

In some embodiments, the data structure 250 can be extended to mapping to a GUI or email containing an item and price offer to a customer and mapping it to an electronic item purchase order specifying a minimum expiration date of a lot of an ordered item. For example, the data structure 250, through a sequence of programs, causes a marketing and promotions program to display a price offer associated to an item archived in the data structure 250 via a GUI. Similarly, the data structure 250 causes, through a series of programs, an electronic purchase order to specify an earliest acceptable lot expiration date.

FIG. 3 is an exemplary block diagram illustrating a computer-implemented method 300 for inventory management including tasks such as but not limited to the Process Order 3100, the Pricing/Promotions Determination 3200, the Store/FC Inventory Management 3300, and the Order Management 3400. At step 3010, the OIMS 220 first provides orders to the WMS 210, identifies inventory items associated with the order, and provides data associated with the identified items to the CMS 230. In some embodiments, the identified items include the existing items in the inventory. In some embodiments, the identified items include newly received items and the existing items in the inventory.

The WMS 210 receives orders from the OIMS 220, assign items from the warehouse/inventory to orders, and provide warehouse/inventory system data and order fulfillment request to the CMS 230. In some embodiments, the WMS 210 assigns items to orders according to the FIFO and/or FEFO rule. The WMS 210, however, does not assign items to orders if the computed time to delivery of an inventory item is negative as discussed below.

At step 3020, the CMS 230 computes the time to delivery of the identified items based on the received data from the OIMS 220. The received data is associated with the identified items including but not limited to manufacturing expiration dates and the numbers of servings.

The rules for computing the time to delivery may be pre-defined and may vary depending on different circumstances. As an example, if an item's serving days are 150 days and the item expires in 180 days according to the manufacturing label, the available time to delivery is at least 30 days (180−150=30). On the other hand, if an item's serving days are 180 days and the item expires in 150 days, the time to delivery is negative 30 days (150−180=−30).

At step 3030, the CMS 230 determines if the computed time to delivery is positive. If the result is not positive (negative) as in the second example above, i.e., the item expires before all servings are consumed, an order cannot be delivered within that time frame. The CMS 230 then blocks the item/lot combination from fulfillment of orders and ends the process. If the result is positive, at step 3040, the WMS 210 assigns items to orders and provides system data and task requests to the CMS 230. At step 3050, the CMS 230 receives task requests from the WMS 210.

Upon receipt of the task requests from the WMS 210, the CMS 230 receives inventory item data from the OIMS 220 at step 3060. In some embodiments, the received inventory item data includes data of the existing items in the inventory. In some embodiments, the received inventory item data includes data of newly received items and the existing items in the inventory.

At step 3070, the CMS 230 calculates the effective expiry of the entire inventory and determines if the entire inventory is in an expiry deficit. In the situation where the received inventory item data includes data of newly received items and the existing items in the inventory, the CMS 230 calculates the effective expiry of the entire inventory including the new items and the existing items. An expiry deficit occurs when the days of sales for the entire inventory become negative. If there is no deficit, at step 3080, the CMS 230 approves receipt of the new items in the inventory. If there is deficit, at step 3090, the CMS 230 calculates the amount of new inventory items that causes the deficit and rejects that amount.

Then at step 3100, the CMS 230 instructs the Execution System 240 to process or fulfill the order based on the identified inventory items with positive time to delivery. In the situation where the inventory items include newly received items and the existing items, the CMS 230 instructs the Execution System 240 to process or fulfill the order based on the existing items and the approved new items. In addition to responding to order fulfillment requests, the CMS 230 may also instruct the Execution System 240 to perform functions such as the Pricing/Promotions Determination 3200, the Store/FC Inventory Management 3300, and/or the Order Management 3400. The automated inventory management system 200 may include one or more automated sub-systems which may be any combination of the above Steps 3010-3400.

Figure 4:
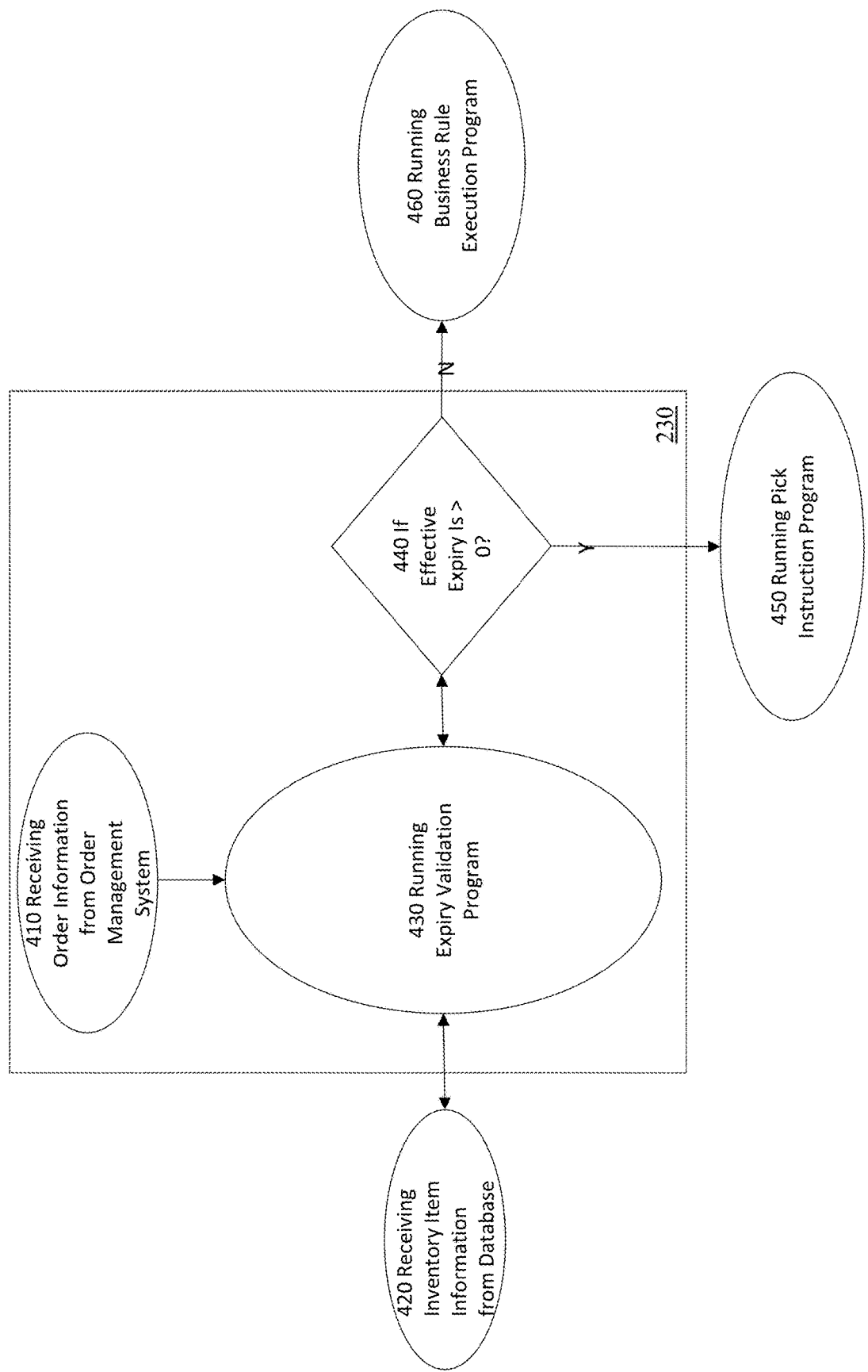
FIG. 4 is an exemplary flow chart illustrating one embodiment of order processing using the inventory management system of FIG. 2A.

FIG. 4 is an exemplary flow chart illustrating one embodiment of the inventory management system 200 processing customer or store order (the Process Order module 3100). The CMS 230 includes at least one or more processors for running computer programs and one or more memories for storing computer program products as a result of running the computer program. In some embodiments, the memories further store a table of business rules as described below.

At Step 410, the communication module of the CMS 230 receives and stores in the memory of the CMS 230 information of a received order from an Order Management System (e.g., the OIMS 220). In some embodiments, the Order Management System has the same function as the OIMS 220, which was described with reference to FIG. 2A. The Order Management System receives orders for items or lots from customers or stores and to manage the received orders. In some embodiments, the Order Management System selects specific items or lots to ship to specific stores based on individual store's item rates of sale or forecasted rates of sale, days of supply, time to expiry of item serving days. Thus, a store with low rates of sales of an item may receive new inventory of an item from a lot with more time to expiration than another store.

At Step 420, the communication module of the CMS 230 receives and stores in the memory of the CMS 230 information pertaining to each item or lot in an inventory from the data structure 250 such of the OIMS 220 described in FIG. 2D. The data structure 250 maintains information of each item or lot including but not limited to:

Item or product description
SKU number
Lot number
Number of available pieces of an item or product of each lot in an inventory
Inventory pick locations
Quantity by location of inventory for each item or product
Expiration date (or expiry) of each lot
Servings units per container of each item or product
Recommended daily dose
Days of servings (serving units divided by recommended daily dose)
Historic rates of sale of units of an item or product regardless of lot
Current orders or open orders for an item or product
Sales forecast or rate of sale (number of items sold per day)
Expected receipt dates for an item or product In some embodiments, the processors of the CMS 230 acts upon data stored in the memory to group items or lots of items in an inventory by expiration dates. As a non-limiting example, the items or lots of items with the same ranges of expiration dates, e.g., 0-30 days, 31-90 days, 91-180 days, etc. are listed in the same column or row of a table. As another non-limiting example, the items or lots of items in the same existing orders and/or having the same expected receipt dates are grouped in the same column or row a table. These arrangements are beneficial in that it would be easier to identify the items or lots of items that need destruction, a markdown, and/or a visible display in the store.

Upon receipt of data at Steps 410-420, the processor of CMS 230 performs Steps 430-440, the results of which it records in its memory activity log. Alternatively, the CMS 230 may continuously monitor item and lot inventory by performing the steps above for all or some expiring items, including steps 430-440. In some embodiments, the CMS 230 may issue item and lot codes, or "flags" to the WMS 210 to record in its memory associated with each item and log wherein such codes may represent one or more of: a) item authorized to ship; b) sequence of items authorized to ship; c) items and quantities at risk of at last partial servings expiry and eligible for promotion; d) items not authorized to ship; e) items authorized to ship by store based on store item servings expiry risk profiles.

At Step 430, the one or more processors of the CMS 230 run a computer program executing steps for calculating the days of sales of the entire inventory and/or the effective expiry similar to those described above, at intervals or continuously based on the received item information from the data structure 250 and orders from the Order Management System. The processors generate and store in the memory a computer program or firmware database product as a result of running the computer program. The computer program includes an Expiry Validation Program that checks, via the processors, items in the inventory that match those in the received order and put lots of the matched items in a sequence. In some embodiments, the Expiry Validation Program put lots of the matched items in a sequence according to the calculated days to expiry of each lot. In some embodiments, the Expiry Validation Program put lots of the matched items in a sequence according to the FIFO and/or FEFO rule.

The Expiry Validation Program computes, via the processors, effective days to expiry for each lot, i.e., the number of days (or other measure of time) remaining to expiration date minus serving days. In some embodiments, the Expiry Validation Program performs, via the processors, a reversed calculation, i.e., the difference of serving days and days to expiry. After the calculation, the processors record the results in the data structure 250. The Expiry Validation Program further provides, based on the computed effective expiry, an estimated time of delivery to the customer or store that has placed the order.

At Step 440, the processors of the CMS 230 determine if the effective expiry computed at Step 430 is greater than zero/positive (>0). If the effective expiry is positive (>0), at Step 450, the one or more processors send instructions to the Execution System 240 to run a Pick Instruction Program. In some embodiment, the Pick/Pack module 8230 (FIG. 8) executes the Pick Instruction Program. The Pick Instruction Program picks the desired quantity of the items or the lots of items from an inventory based on the sequence of the lots to fulfill the order.

If the effective expiry is negative (<0), at Step 460, the one or more processors send instructions to the Execution System 240 to trigger a Business Rule Execution Program for the items or the lots of items in an inventory. The Business Rule Execution Program runs according to pre-defined business rules, resulting in automatic performance of functions including destroying the expired items or lots of items or applying markdown to the items that are about to expire.

A table of business rules is stored in the memory of the CMS 230. These rules include:

Rule 1: Do-not-sell rule: if the number of days remaining (effective expiry) after subtracting the number of serving days with the number of days to expiration (the manufacturing expiration date) for an item or a lot of an item is <X days or <Y % of days to expiration, destroy the item or the lot of item from the inventory;

Rule 2: Order-fulfillment-prioritization rule: prioritize the shipment of an item or a lot of an item in an inventory that satisfies Rule 1 above with the effective expiry equal to or approaching X days or Y % of days to expiration of the manufacturing expiration date.

In some embodiments, the processors execute a computer program as part of each order fulfillment process which obtains data of an ordered item and executes the business rules with the obtained data to produce a program product that provides item pick instructions to a Pick module such as the Pick/Pack module 8230 in FIG. 8. The processors may connect to an electronic device that a picker carries to facilitate the pick to identify an item that satisfies the business rules for an order, a pick location, and the quantity of the item to pick. Notably, this process executes within fractions of a second for many thousands of lots, items, servings sizes, and orders that are being picked in real time, which is not feasible manually by any number of people since calculations are parallel and must be compared for multiple variables at once; and the actions at each stop are stored in computer memory for future reference and/or for modules such as the Inventory Management/Audit/Adjustments 8250 in FIG. 8 to perform transaction logging to satisfy audit requirements.

An illustrative example of applying the above-described steps for the CMS 230 to process customer or store order is pre-processing eligible items or lots in the inventory. In one embodiment, at Steps 410, the CMS 230 periodically queries the WMS 210 or other system(s) of record memory for all items or lots in an active inventory for attributes such as expiry date and serving days of items/lots. At Steps 430 and 440, the one or more processors that run on the CMS 230 execute the computer program including but not limited to an Expiry Validation Program to compute effective expiry (days remaining from expiry–serving days) for each item or lot. If the effective expiry is positive, the CMS 230 writes to the memory of the WMS 210 a field flag which authorizes the item or lot with positive expiry for order fulfillment. A Pick module such as the Pick/Pack module 8230 in FIG. 8 on the WMS 210 or Execution System 240 executes pick program FIFO and/or FEFO for the authorized item or lot by checking its location and quantity and determining a desired pick path and/or process. If the effective expiry is not positive, the CMS 230 writes to the memory of the WMS 210 a field flag which blocks the item or lot with negative expiry for order fulfillment, and the process ends.

Another illustrative example of applying the above-described steps for the CMS 230 to process customer or store order is on-the-fly processing. In one embodiment, the CMS 230 performs Steps 410 and 430-440 as in the above pre-processing example. The CMS 230 additionally, at Step 420, periodically queries an Order Management System such as the OIMS 220 for information of an order with a desired quantity of an item or lot. Then the CMS 230 computes if the authorized quantity for the item or lot in the inventory is sufficient to meet the desired order quantity. If the inventory is insufficient to meet the desired order quantity, i.e., an order could not be entirely completed, the CMS 230 reports back to the Order Management System and writes to the memory of the WMS 210 a field flag which authorizes the item or lot with positive expiry for order fulfillment. Finally, the WMS 240 executes pick program FIFO and/or FEFO for the authorized item or lot by checking its location and quantity and determining a desired pick path and/or process.

Figure 5:
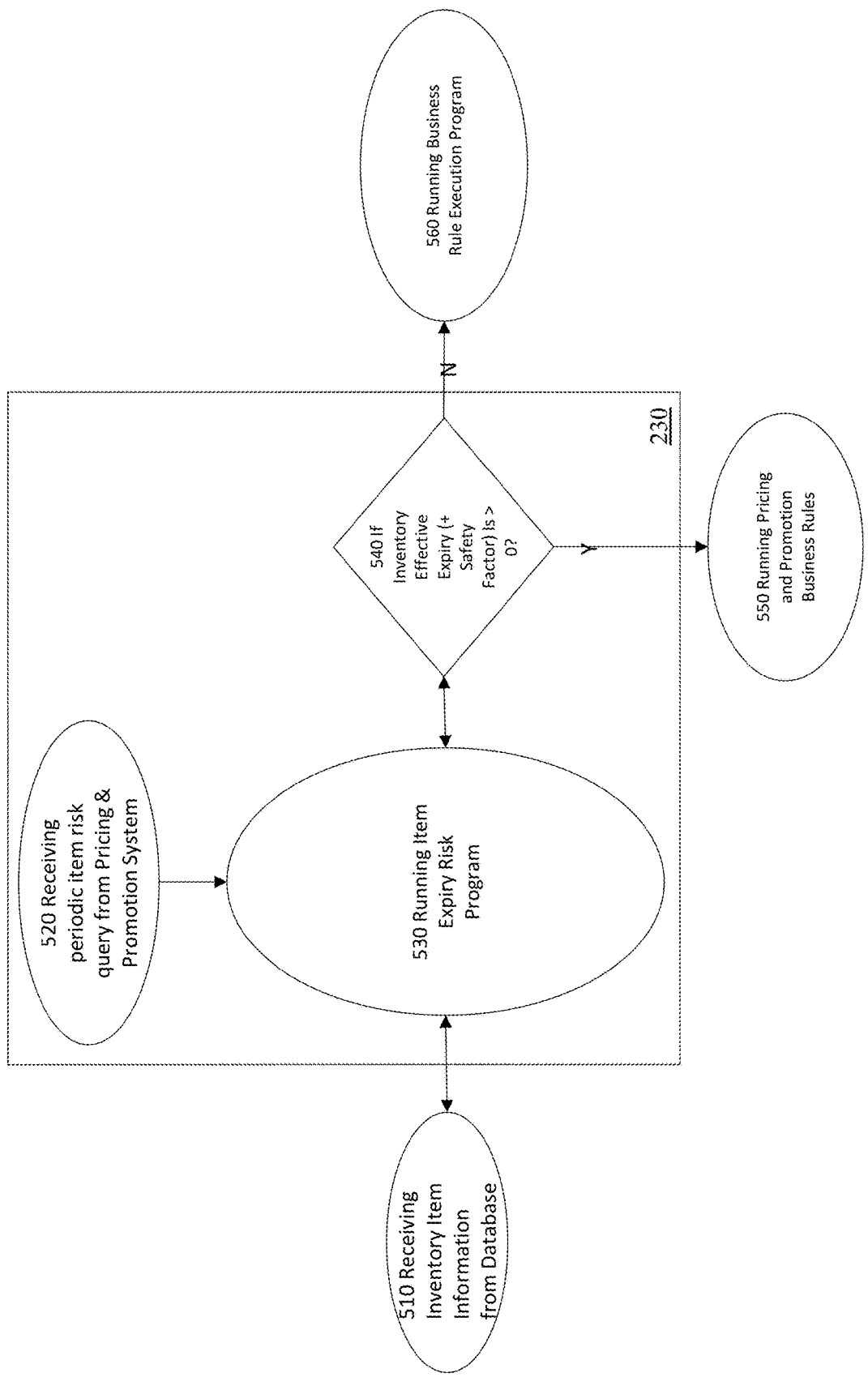
FIG. 5 is an exemplary flow chart illustrating one embodiment of evaluating inventory risk of an expiring item based on days of supply, serving days, and days to expiry using the inventory management system of FIG. 2A.

FIG. 5 is an exemplary flow chart illustrating one embodiment for making the Pricing/Promotions 3200 and performing the Store/FC Inventory Management 3300 by evaluating expiring item inventory risk based on days of supply, serving days, and days to expiry using the inventory management system 200. At Step 510, the communication module of the CMS 230 receives periodic item risk queries for an item or a lot of an item in an inventory from a Pricing & Promotion System such as the Marketing/Pricing System 8500 in FIG. 8. The communication module stores the received periodic item risk queries in the memory of the CMS 230. The Pricing & Promotion System generates item risk queries periodically and provide them to the one or more processors of the CMS 230.

At Step 520, based on the received periodic item risk queries, the communication module of the CMS 230 receives and stores in the memory information pertaining to each item or product in an inventory from the data structure 250.

At Step 530, the one or more processors of the CMS 230 run a computer program at intervals or continuously based on the received item information from the data structure 250 and the periodic item risk queries from the Pricing & Promotion System. A central processing unit (CPU) as described in FIGS. 9A and 9B generates, and stores in the memory, computer program products including but not limited to an Item Expiry Risk Program. The Item Expiry Risk Program computes via the one or more processors a) days of inventory supply by taking into account the sales forecast for the item or the lot of the item under evaluation, and b) effective expiry, which is the days to expiry minus serving days for the evaluated item or lot of the item. After the calculation, the one or more processors store the results in the data structure 250. The Item Expiry Risk Program further provides, based on the computed effective expiry, an estimated time of delivery if the evaluated item is in a customer or a store order.

At Step 540, the one or more processors determine if the evaluated item is at risk of expiry. In some embodiments, the evaluated item is at risk of expiry when the effective expiry computed at Step 530 is greater than zero. In some embodiments, the evaluated item is at risk of expiry when the computed effective expiry plus a safety factor, such as but not limited to an extra number of days, is greater than zero. If the result is yes, the evaluated item is at risk of expiry, then at Step 550, the one or more processors send instructions to the Execution System 240 to run Pricing and Promotion Business Rules that process the at-risk item in the inventory. In some embodiments, processing the at-risk item includes but not limited to destroying, issuing markdown, or displaying more visibly the expiring item or the lot of item.

As a non-limiting example, if an inventory has 100 units of item A, and the sales forecast for item A is one unit per day, the days of supply of item A is 100 days. The serving days of item A are 90 days and the days to expiry for a certain lot of item A are 150 days. Thus, the effective expiry of item A is 150−90=60 days. During the 60 days, 60 units of item A will be sold, leaving 40 (100−60) units remaining in the inventory at expiry risk upon customer delivery. In this case, the processors of the CMS 230 instruct the Execution System 240 to run Pricing and Promotion Business Rules that process the at-risk inventory.

If the evaluation result is that the item is not at risk of expiry, then at Step 560, the one or more processors instruct the Execution System 240 to trigger a Business Rule Execution Program for timing of the next item risk evaluation cycle.

The method for evaluating expiring item inventory risk and pricing and promotion based on days of supply, serving days, and days to expiry shown in FIG. 5 is particularly suited for a warehouse and store inventory systems. However, those of skill in the art would understand that, in some embodiments, the inventory management system 200 performs inventory risk management at a store level to make pricing and promotion decisions based on days of supply, serving days, and days to expiry. As noted above, stores have unique item inventory levels, rates of sale, sales forecasts, and price elasticities. As such, in addition to the steps performed above, the processors of the CMS 230 manage store replenishment and item markdowns according to the business rules described herein, applied to store-level data.

Figure 6:
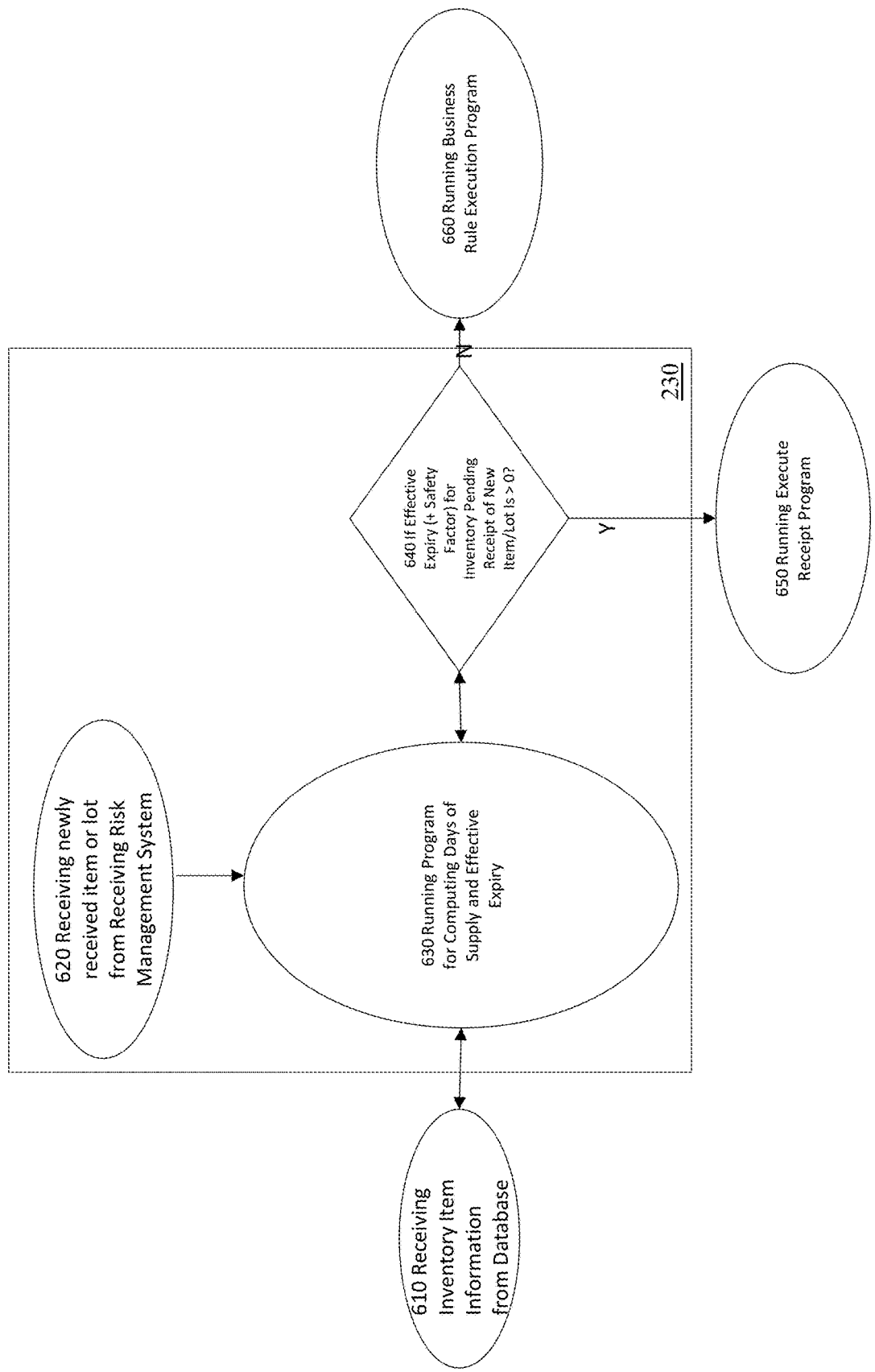
FIG. 6 is an exemplary flow chart illustrating one embodiment of making newly received item risk assessment based on days of supply, serving days, and days to expiry using the inventory management system of FIG. 2A.

FIG. 6 is an exemplary flow chart illustrating one embodiment of the inventory management system 200 performing the Order Management 3400 by making risk assessment for receiving new items in an inventory based on days of supply, serving days, and days to expiry. At Step 610, the communication module of the CMS 230 receives and stores in the memory of the CMS 230 data for each newly received item or lot via a Receiving Risk Management System such as the Receiving module 8210 in FIG. 8. The Receiving Risk Management System identifies attributes of the newly received item or lot and to send these data for the one or more processors to process. At Step 620, based on the newly received item or lot, the communication module of the CMS 230 receives and stores in the memory of the CMS 230 information pertaining to each item or product in the inventory from a data structure 250 similar to but not limited to the data structure 250.

At Step 630, the one or more processors of the CMS 230 run a computer program at intervals or continuously based on the received item information from the data structure 250 and the data for each newly received item or lot from the Receiving Risk Management System. The processors generate, and store in the memory, a program. The program computes via the one or more processors a) days of inventory supply including items pending receipt based on at least the sales forecast for each item or lot of item pending receipt, and b) effective expiry of the item or lot pending receipt. After the calculation, the one or more processors store the results in the data structure 250. The program provides, based on the computed effective expiry, an estimated time of delivery to customer of the item or lot pending receipt.

At Step 640, the one or more processors determine if the inventory pending receipt the new items or lots is at risk of expiry. In some embodiments, the inventory pending receipt the new items or lots is at risk of expiry when the effective expiry computed at Step 630 is greater than zero. In some embodiments, the evaluated inventory pending receipt the new items or lots is at risk of expiry when the computed effective expiry plus a safety factor is greater than zero. If the result is yes, then at Step 650, the one or more processors instruct the Execution System 240 and/or the Receiving Risk Management System to run an Execute Receipt Program rejecting the entire or partial newly received items or lots and return the rejected portion to vendor. In some embodiment, a vendor system such as the Vendor System 8400 in FIG. 8 returns rejected new items to vendors based on data received and stored on the vendor system.

As a non-limiting example, an inventory has 50 units of item C and pending receipt of another 50 units of item C. The sales forecast for item C is one unit per day. The serving days of item C are 90 days and the days to expiry for item C (for both the new lots and the existing lots in the inventory) are 150 days. Thus, the effective expiry of item C is 150−90=60 days. During the 60 days, 60 units of item C will be sold, leaving 40 (100−60) units if the pending new lots are to be received in the inventory. In this case, the processors instruct the Execution System 240, the Receiving Risk Management System, and/or a vendor system to reject the extra 40 unit of the new lots and return them to the vendor.

If the evaluation result is that the inventory pending receipt the new items or lots is not at risk of expiry, at Step 660, the one or more processors instruct the Execution System 240 and/or the Receiving Risk Management System to run a Business Rule Execution Program for receiving the new items or lots and putting them away in the inventory.

Figure 7:
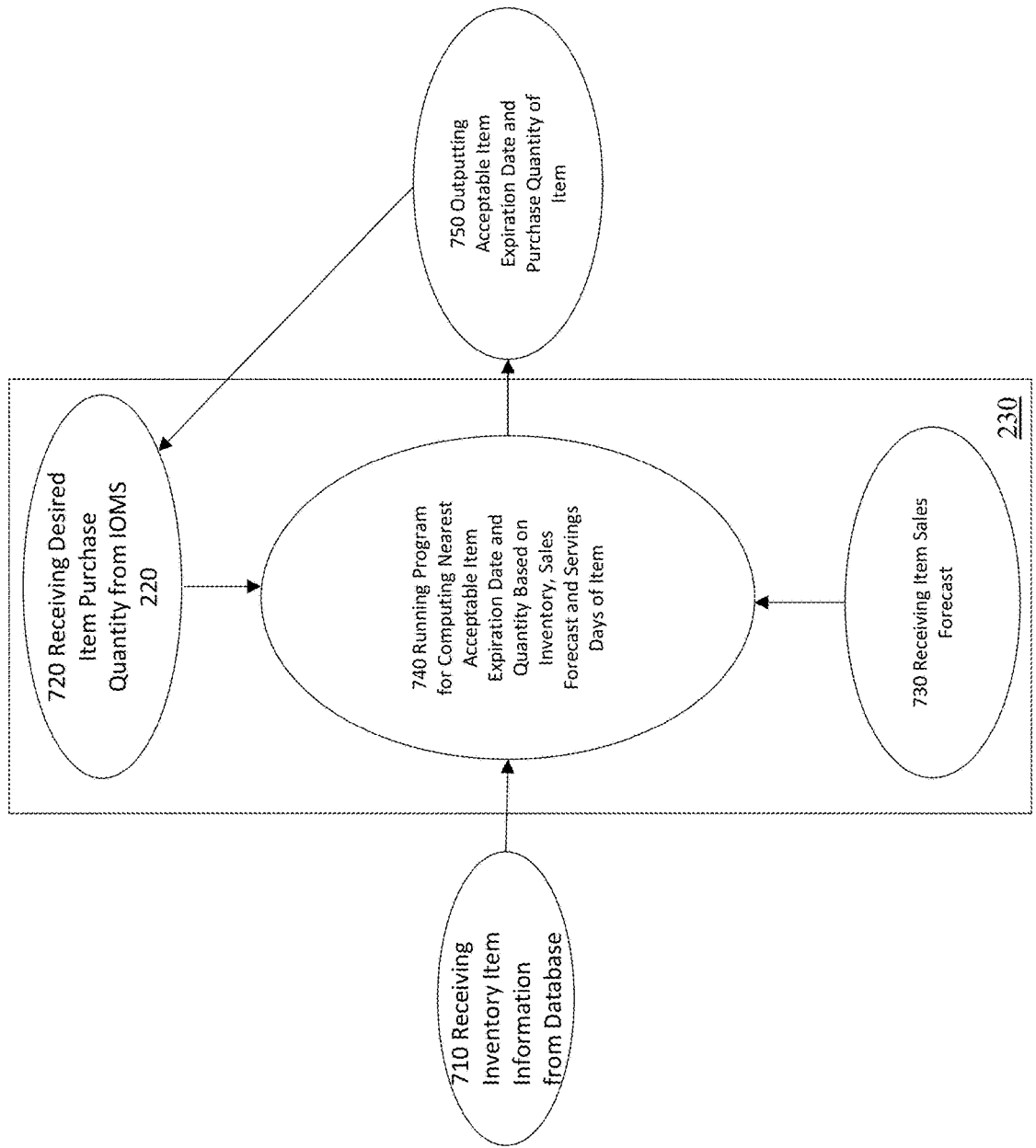
FIG. 7 is an exemplary flow chart illustrating one embodiment of order management based on days of supply, serving days, and days to expiry using the inventory management system of FIG. 2A.

FIG. 7 is an exemplary flow chart illustrating one embodiment of the inventory management system 200 performing the Order Management 3400 based on days of supply, serving days, days to expiry, and sales forecasts. At Step 710, the communication module of the CMS 230 receives and stores in the memory of the CMS 230 data for a desired item purchase quantity for an item or lot from an Order Management System such as the OIMS 220. At Step 720, based on the received data for a desired item purchase quantity for the item or lot, the communication module of the CMS 230 receives and stores in the memory of the CMS 230 information pertaining to each item or product in the inventory from a data structure 250. At Step 730, the communication module of the CMS 230 receives and stores in the memory sales forecast for the item or lot from forecasting systems such as the Planning/Forecasting System 8600 in FIG. 8. At Step 740, the processors run a computer program at intervals or continuously based on the received item information from the data structure 250 and the data for the desired item purchase quantity from the Order Management System and forecasting systems. The processors generate, and store in the memory, a program for computing the nearest acceptable item expiration date and quantity based on inventory, sales forecast and serving days of the item or lot. At Step 750, the one or more processors output acceptable item expiration date and purchase quantity of item.

As a non-limiting example, in one embodiment, the CMS 230 and an Order Management System perform periodic inventory and sales forecast assessments via at least forecasting systems at Step 720. For example, the CMS 230 determines that 600 units of inventory are at risk and instructs the OIMS 220 to query forecasting systems, the WMS 210 of the inventory, vendor lead time database from a vendor system such as the Vendor System 8400 in FIG. 8 for lead time of item, i.e., the time it takes to receive an item ordered from a supplier, minimum order quantity and suggested order quantity and provides data to the CMS 230. Then the CMS 230 receives sales forecast data from forecasting systems at Step 730. Table 1 is a nonlimiting example of the sales forecast data that the CMS 230 receives.

TABLE 1

| | |
|---|---|
| Sku Serving days | 180 |
| Days To Lot Expiry | 210 |
| Days Before Servings Begin To Expire | 30 |
| Inventory | 1500 |
| New Daily Sales forecast | 30 |
| Days of Supply | 50 |
| At risk inventory | 600 |
| Purchase Order Lead Time in Days | 30 |
| Effective Days of Supply | 30 |
| Minimum Order Quantity | 600 |
| Expected Inventory At Time Of PO Receipt | 0 |
| Days Of Supply Of Order Quantity | 20 |
| Purchase Quantity | 990 Added 10% Safety Margin |
| Earliest Expiring Lot Date Acceptable | Current Date + 240 Days (Without Safety Margin), Or Current Date + 246 Days (With Safety Margin) |

Based on the received data, the CMS 230 computes a proposed order quantity and an earliest expiring date for a received item or lot at Step 740. In one embodiment, the CMS 230 computes according to formula: Days Before Servings Begin To Expire* Purchase Order Lead Time in Days=Purchase Quantity (30*30=900). The CMS 230 then determines the proposed order quantity by taking the greater value of Minimum Order Quantity (600) and Days Before Servings Begin To Expire*Purchase Order Lead Time in Days (900), which is 900. Finally, the CMS 230 computes an earliest expiring date for the received item or lot as based on at least the proposed order quantity. For example, the CMS 230 computes the earliest expiring date according to formula: current date+Purchase Order Lead Time in Days+Proposed Order Quantity/New Daily Sales Forecast+Sku Serving days (current date+30+900/30+180=current date+240 days).

In another embodiment, the CMS 230 adds a safety margin such as 10%/0.1 in the above formula: Days Before Servings Begin To Expire*Purchase Order Lead Time in Days*(1+Safety Margin)=Purchase Quantity (30*30*(1+0.1)=990). The CMS 230 then determines the proposed order quantity by taking the greater value of Minimum Order Quantity (600) and Days Before Servings Begin To Expire*Purchase Order Lead Time in Days*(1+Safety Margin) (990), which is 990. Finally, the CMS 230 computes the earliest expiring date according to formula: current date+Purchase Order Lead Time in Days+Proposed Order Quantity/New Daily Sales forecast*(1+0.1)+Sku Serving days (current date+30+990/30*1.1+180=current date+246 days).

At Step 750, the CMS 230 sends the computed proposed order quantity and the earliest expiring date for the received item or lot to the OIMS 220, which places an order due in 30 days for 900/990 units with an expiry date of not earlier than current date+240 days (without safety margin) or current date+246 days (with safety margin).

FIG. 8 shows an exemplary embodiment of the modules that comprise the inventory management system of FIG. 2A. In one embodiment, the inventory management system of FIG. 2A includes one or more sub-systems such as the WMS 210 for managing fulfillment functions such as receiving, order processing, shipping, the CMS 230 for performing the inventive steps, the Order Management System 8200 for managing customer and/or store orders, the Purchasing System 8300 for storing and processing purchase orders (PO's), the Vendor System 8400 which may provide shipment data in response to purchase orders and may use Electronic Data Interchange ("EDI") or similar automated means for communicating with the OIMS 220 and WMS 210 of the customer, the Marketing/Pricing System 8500 for issuing promotions or markdowns, the Planning/Forecasting System 8600 for making sales forecasts, a store Point of Sale (POS)/Inventory Management System 8700 or similar store system for performing some or all of the steps of CMS 230 to manage store inventory either locally in a store or remotely via remote servers such as cloud-based servers.

A traditional WMS 210 and its typical modules may be placed in the solid line of FIG. 8.

In some embodiments, the CMS 230 may be placed external to the WMS 210 and interact with its modules. In one embodiment, the CMS 230 may be a system on its own. In one embodiment, the CMS 230 can be a module within the ERP system as described in FIG. 2A. Exemplary ERP systems include but not limited to systems 8200-8700 except system 8400, an exemplary independent external vendor system, all of which are described further below. Additionally and/or alternatively, although the WMS 210 and the ERP system are shown as distinct modules, the WMS 210 and the ERP system can comprise a single module for performing warehouse functions.

The dotted line of the CMS 230, which partially encompasses the ERP modules, indicates that the CMS 230 may be placed within any or all of the ERP modules, or interact with them as a separate module. In some embodiment, the dotted line does not run through the ERP modules, and the functions of the modules can be called while the CMS 230 is running the computer program.

The inventory management system of FIG. 2A also includes one or more of databases, one or more processors, one or more memories, and/or one or more distributing computing devices that may reside internal or external to one or more of the systems 210, 230, 8200, 8300, 8400, 8500, 8600 and/or 8700. In some embodiments, modules such as the Receiving module 8210 and the Pick/Pack module 8230 may further include wireless devices such as hand-held information receiving and scanning devices.

In an exemplary embodiment, the WMS 210 includes but not limited to one or more modules such as the Receiving module 8210 for storing attributes of a newly received item or lot, the Order Processing module 8220 for fulfilling orders, the Pick/Pack module 8230 for picking the desired quantity of the items or the lots of items from an inventory, a Shipping module 8240 for shipping the desired quantity of the items or the lots of items to stores or customers, the Inventory Management/Audit/Adjustments module 8250 for performing transaction logging to satisfy audit requirements. Although shown and described as residing at the WMS 210, the above modules can also be placed on other sub-systems 8200-8700 as desired.

In one embodiment, the Pick/Pack module 8230, the Receiving module 8210, the Marketing/Pricing System 8500, the Inventory Management/Audit/Adjustments module 8250, and/or the Purchasing module 8300 can be placed in the Execution System 240.

The CMS 230 can be placed outside or inside systems 210, 8200, 8300, 8400, 8500, 8600 and/or 8700. As discussed, in one embodiment, the CMS 230 processes customer or store orders by pre-processing eligible items or lots in the inventory and flag items or lots to authorize or block the items or lots. In another embodiment, the CMS 230 processes orders on the fly. In another embodiment, the CMS 230 both pre-processes eligible items or lots and processes orders on the fly.

In one embodiment, the WMS 210 provides data to the Planning/Forecasting System 8600 to make sales forecasts. The Planning/Forecasting System 8600 then sends data of sales forecasts to the Order Management System 8200 for making risk assessment based on at least the received sales forecasts, which in turn sends order fulfillment requests to the Order Processing module 8220 for fulfilling the orders.

In some embodiments, the Order Management System 8200 sends results of risk assessment to the store POS/Inventory Management System 8700 for managing store inventory.

In some embodiments, the Planning/Forecasting System 8600 directly sends data of sales forecasts to the Store POS/Inventory Management System 8700 for managing store inventory.

In some embodiments, the Planning/Forecasting System 8600 sends data of sales forecasts to the Purchasing System 8300 to process PO's and determine quantity for purchase based on the sales forecast. After the purchase of new items or lots, the Purchasing System 8300 further sends data to the Receiving module 8210 for processing data of new items or lots.

In another embodiment, the Vendor System 8400 sends vendor information of the newly received items or lots to the Receiving module 8210 for returning all or part of the new items to the vendor when the Receiving module 8210 determines to reject the same at receiving.

In another embodiment, the Planning/Forecasting System 8600 sends data of sales forecasts to the Marketing/Pricing System 8500 for making promotion to increase the rate of sale for at-risk inventory.

The above modules and/or systems may in any combination communicate data and/or instructions in any order for the exemplary inventory management system and computer-implemented method to perform a desired function in inventory management.

Illustrative Examples of Applications of the Inventory Management System

In some embodiments, the present disclosure provides an exemplary inventory management system and computer-implemented method for optimizing warehouse receiving. As a non-limiting example, an item with 120 serving days and an expiration date in 180 days from the delivery date to the warehouse is received. The exemplary inventory management system and computer-implemented method launches a process that: a) determines that the item has (180−120=60) days prior to the time that at least some portion of its unconsumed servings would expire (effective expiry); b) checks existing inventory days of supply in the warehouse and determines that the warehouse could only provide the desired items arriving at day 65; c) advises that the delivery should be rejected because the arrival date is later than 60 days. The exemplary inventory management system and computer-implemented method perform the above function by accessing multiple entries in a database, e.g., inventory attributes, sales, and the item attributes including the expiration date and serving days, and triggering a do-not-sell business rule applicable to managing receipt of items from a warehouse. The exemplary inventory management system and computer-implemented method perform the above function by further sending relevant instructions to terminals advising or preventing certain actions that are performed automatically on computers at the terminals. In some embodiments, the sent instructions include but not limited to accepting or rejecting the item in the inventory.

In some embodiments, the present disclosure provides an exemplary inventory management system and computer-implemented method for managing inventory at a particular retail location. As a non-limiting example, the exemplary inventory management system and computer-implemented method encodes attributes information of expiring food items such as meat. In some embodiments, the encoding includes encoding item attributes information such as the specific servings of meat, the expiration date, days remaining in relation to expiration and days of supply of such meat, and location of a particular store. Based on these encoded data, the exemplary inventory management system and computer-implemented method advise when to issue markdown, issue and/or register new price label to apply to the item, advise when to remove the item from sale, and/or evaluate the risk of the inventory loss. Again, the exemplary inventory management system and computer-implemented method perform the above function by at least accessing computer databases and terminals to direct and validate physical transactions automatically.

In some embodiments, the present disclosure provides an exemplary inventory management system and computer-implemented method for fulfilling orders. As a non-limiting example, the exemplary inventory management system and computer-implemented method receives a customer or store order for a specific item such as fish oil with 120 serving days. The exemplary inventory management system and computer-implemented method record relevant information including but not limited to the days of supply of the fish oil or each lot of the fish oil in the store and in-transit to the store (if a store order) and the expiration date of each lot of the fish oil available in the warehouse. The exemplary inventory management system and computer-implemented method calculate the days remaining for each lot by subtracting the 120 serving days from the lot expiration date and determining which lot to pick, to destroy, or to advise the markdown to accelerate sales and to prevent loss.

FIGS. 9 and 10 provide functional block diagram illustrations of general-purpose computer hardware platforms. FIG. 9 illustrates a network or host computer platform, as may typically be used to implement a server such as any of the servers described herein. FIG. 10 depicts a computer with user interface elements such as a computer screen 1030, as may be used to implement a control system (not shown) or other type of workstation or terminal device of the inventory management system 200, although the computer of FIG. 10 may also act as a server if appropriately programmed. It is believed that those skilled in the art are familiar with the structure, programming, and general operation of such computer equipment and as a result the drawings should be self-explanatory.

Figures 9A, 9B:
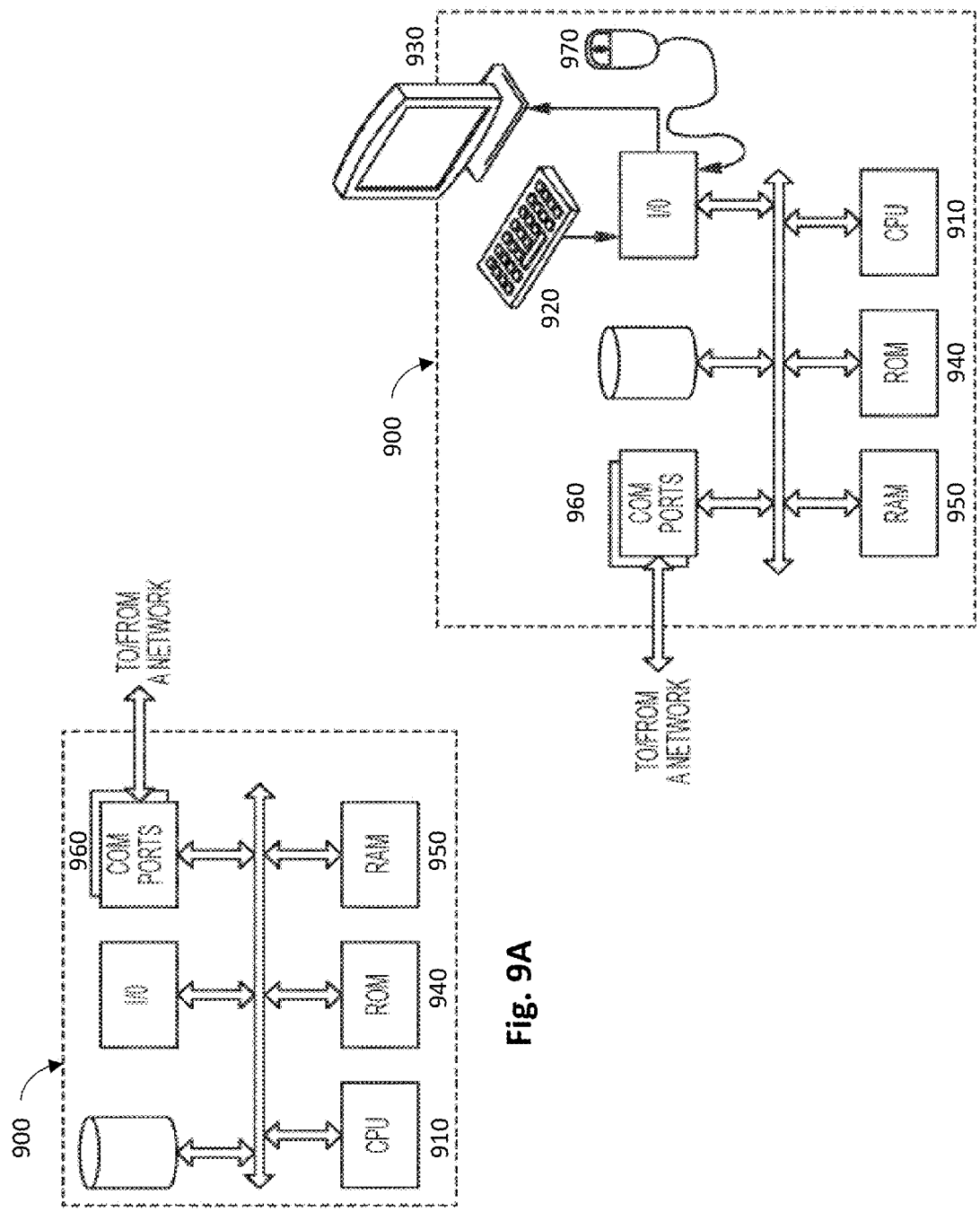
FIGS. 9A and 9B are simplified functional block diagrams of one embodiment of the computer hardware platforms that may be used to implement functionalities of the inventory management system of FIG. 2A.

The computer system 900 illustrated in FIG. 9A includes a processor 910, such as a CPU, an input device (not shown) coupled to the processor 910, an output device (not shown) coupled to the processor 910, and memory devices (e.g., ROM 940 and RAM 950) each coupled to the processor 910. The computer system 900 further includes one or more COM (communication) ports 960, which is the hardware interface for the computer system 900 to communicate with a network.

FIG. 9B is an illustrative example of the computer system 900 of FIG. 9A. FIG. 9B shows a processor (e.g., CPU 910), an input device (e.g., keyboard 920 and mouse 970) coupled to the processor 910, an output device (e.g., computer screen 930) coupled to the processor 910, and memory devices (e.g., ROM 940 and RAM 950) each coupled to the processor 910. The input device may be a keyboard 920, a mouse 970, a camera, or a touchscreen (not shown). The output device may be a computer screen 930, a printer, a plotter, a magnetic tape, a removable hard disk, or a floppy disk (not shown). The computer system 900 further includes one or more COM (communication) ports 960, which is the hardware interface for the computer system 900 to communicate with a network.

The memory devices may be a read-only memory (e.g., ROM 940), a dynamic random access memory (e.g., DRAM/RAM 950), a hard disk, a floppy disk, a magnetic tape, an optical storage such as a compact disc (CD) or a digital video disc (DVD) (not shown).

The memory devices (e.g., ROM 940 and RAM 950) may include a computer code (not shown). The computer code includes instructions for improving software implemented promotional structure generation technology associated with receiving electronic data comprising shipment identification data for a shipment of an item, authorizing a shipping client associated with freight carrier to generate visible promotional structures associated with specified packages, and generating and presenting a physical or digital visible promotional structure associated the package for delivery or a demographic profile of a package recipient. The processor (e.g., CPU 910) executes the computer code.

The memory devices (e.g., ROM 940 and RAM 950) include input data such as warehouse/inventory system data and inventory item data that CMS 230 receives from WMS 210 and OIMS 220. The input data includes input required by the computer code. The output device (e.g., computer screen 930) displays output from the computer code. Either or both memory devices (e.g., ROM 940 and RAM 950), or one or more additional memory devices, may include instructions (e.g., the processes described in connection with FIGS. 2B, 2C, and 3) and may be used as a computer usable medium, a computer readable medium, or a program storage device having a computer readable program code embodied therein and/or having other data stored therein, wherein the computer readable program code includes the computer code. Generally, a computer program product, or alternatively, an article of manufacture, of the computer system 900 may include the computer usable medium or the program storage device.

In some embodiments, rather than being stored and accessed from a hard drive, optical disc or other writeable, rewriteable, or removable hardware memory device 950, stored computer program code may be stored on a static, nonremovable, read-only storage medium such as a Read-Only Memory (ROM) device 940, or may be accessed by processor 910 directly from such a static, nonremovable, read-only medium 940. Similarly, in some embodiments, stored computer program code may be stored as computer-readable firmware, or may be accessed by processor 910 directly from such firmware, rather than from a more dynamic or removable hardware data-storage device, such as a hard drive or optical disc.

While FIGS. 9A and 9B show the computer system 900 as a particular configuration of hardware and software, any configuration of hardware and software, as would be known to a person of ordinary skill in the art, may be utilized for the purposes stated above in conjunction with the particular computer system 900 of FIGS. 9A and 9B. For example, the memory devices (e.g., ROM 940 and RAM 950) may be portions of a single memory device rather than separate memory devices.

While embodiments of the present disclosure have been described herein for purposes of illustration, many modifications and changes will become apparent to those skilled in the art. Accordingly, the appended claims are intended to encompass all such modifications and changes as fall within the true spirit and scope of this invention.

The entirety of this disclosure (including the Cover Page, Title, Headings, Field, Background, Summary, Brief Description of the Drawings, Detailed Description, Claims, Abstract, Figures, and otherwise) shows by way of illustration various embodiments in which the claimed disclosure may be practiced. The advantages and features of the disclosure are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the disclosure or that further undescribed alternate embodiments may be available for a portion is not to be considered a disclaimer of those alternate embodiments. It will be appreciated that many of those undescribed embodiments incorporate the same principles of the disclosure and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program modules (a module collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one embodiment, and inapplicable to others. In addition, the disclosure includes other systems and methods not presently claimed. Applicant reserves all rights in those presently unclaimed embodiments including the right to claim such embodiments, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims.

Aspects of the present system may take the form of an entirely hardware embodiment, an entirely software embodiment (including firmware, resident software, micro-code, etc.), or an embodiment combining software and hardware aspects that may all generally be referred to herein as a "circuit," "module," or "system."

The present disclosure may be embodied a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the above. A non-exhaustive list of more specific examples of the computer readable storage medium includes a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present invention are described herein with reference to flowchart illustrations and/or block diagrams of methods, device (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-based method for managing an electronic purchase order including one or more items, said method comprising:
    receiving, from an order management system, a quantity of a selected item of the electronic purchase order;
    requesting, from a warehouse management system, attributes of the selected item, the attributes comprising available lots that include the selected item, an amount of inventory of a selected lot of the available lots, an expiration date associated with the selected lot, and a serving days of the selected item;
    determining a difference between the expiration date associated with the selected lot and a predetermined date;
    comparing the serving days of the selected item with said determined difference; and
    providing an instruction, via a communications protocol over a data network, to the warehouse management system, based on said comparing.

2. The method of claim 1, wherein said comparing the serving days of the selected item with said determined difference comprises:
    computing a difference between the expiration date associated with the selected lot, the predetermined date, and the serving days of the selected item; and
    comparing the computed difference to a predetermined threshold.

3. The method of claim 2, wherein said providing the instruction further comprises:
    if the computed difference is above the predetermined threshold, providing the instruction to maintain an attribute of the selected item maintained in the warehouse management system representing a current price of the selected item; and
    if the computed difference is below the predetermined threshold, providing the instruction to markdown the attribute representing the current price of the selected item.

4. The method of claim 3, wherein the predetermined threshold is zero.

5. The method of claim 2, wherein said providing the instruction further comprises:
    if the computed difference is below the predetermined threshold, providing the instruction to prioritize shipment of the available lots of the selected item.

6. The method of claim 5, wherein said providing the instruction to prioritize shipment of the available lots of the selected item further comprises:
    ordering the available lots of the selected item based on the amount of inventory of the available lots and the computed difference.

7. The method of claim 1, wherein said providing the instruction further comprises:
    picking a lot of the selected item from the available lots, the picked lot having a smallest difference between the expiration date of the picked lot, the predetermined date, and the serving days of the selected item, wherein the smallest difference is above a predetermined threshold; and
    determining if a quantity of the picked lot is greater than the quantity of the selected item of the electronic purchase order:
        if the quantity of the picked lot is equal or greater than the quantity of the item of the electronic purchase order, flagging an error; and
        if the quantity of the picked lot is less than the quantity of the item of the electronic purchase order, repeating said picking and said determining the quantity of the picked lot.

8. The method of claim 1, wherein the attributes of the selected item further comprise a type of the selected item, and wherein the selected item of the electronic purchase order is one of an existing item in an inventory and a newly received item having a same type as the existing item.

9. The method of claim 1, wherein the attributes of the selected item further comprise a type of the selected item, said method further comprising:
   selectively receiving a new item having a same type as the selected item in the inventory;
   computing a difference between the expiration date associated with the newly received item, the predetermined date, and a serving days of the newly received item;
   computing days of sales of the entire inventory comprising the newly received item and the selected item; and
   determining if the computed days of sales is greater than the computed difference associated with the newly received item:
      if the days of sales is greater than the computed difference, rejecting all or part of the newly received item; and
      if the days of sales is equal to or less than the computed difference, accepting the newly received item.

10. The method of claim 9, wherein computing the days of sales of the entire inventory further comprises:
   obtaining a forecast sales rate of each of the newly received item and the selected item.

11. The method of claim 1, further comprising storing, in a data structure of a database of the warehouse management system, the computed difference between the expiration date associated with the selected lot and the predetermined date.

12. The method of claim 11, further comprising mapping the data structure to the electronic purchase order and further defining in the data structure a minimum expiration dates of the available lots of the selected item.

13. A computer-based system for managing an electronic purchase order including one or more items, said system comprising:
   one or more memory devices storing instructions; and
   one or more processors configured to execute instructions to perform operations comprising:
      receiving an a quantity of a selected item of the electronic purchase order;
      requesting attributes of the selected item, the attributes comprising available lots that include the selected item, an amount of inventory of a selected lot of the available lots, an expiration date associated with the selected lot, and a serving days of the selected item;
      determining a difference between the expiration date associated with the selected lot and a predetermined date;
      comparing the serving days of the selected item with said determined difference; and
      transmitting a message, via a communications protocol over a data network, to the warehouse management system, based on said comparing.

14. The computer-based system of claim 13, wherein said instructions for comparing the serving days of the selected item with said determined difference comprises:
   computing a difference between the expiration date associated with the selected lot, the predetermined date, and the serving days of the selected item; and
   comparing the computed difference to a predetermined threshold.

15. The computer-based system of claim 14, wherein said instructions for transmitting the message further comprises:
   if the computed difference is above the predetermined threshold, transmitting the message to maintain an attribute of the selected item maintained in the warehouse management system representing a current price of the selected item; and
   if the computed difference is below the predetermined threshold, transmitting the message to markdown the attribute representing the current price of the selected item.

16. The computer-based system of claim 14, wherein said transmitting the message further comprises:
   if the computed difference is below the predetermined threshold, transmitting the message to prioritize shipment of the available lots of the selected item.

17. The computer-based system of claim 16, wherein said transmitting the message to prioritize shipment of the available lots of the selected item further comprises:
   ordering the available lots of the selected item based on the amount of inventory of the available lots and the computed difference.

18. A non-transitory computer-readable medium storing instructions that, when executed by a processor, perform operations for managing an electronic purchase order including one or more items, the operations comprising:
   receiving a quantity of a selected item of the electronic purchase order;
   requesting attributes of the selected item, the attributes comprising available lots that include the selected item, an amount of inventory of a selected lot of the available lots, an expiration date associated with the selected lot, and a serving days of the selected item;
   determining a difference between the expiration date associated with the selected lot and a predetermined date;
   comparing the serving days of the selected item with said determined difference; and
   transmitting a message, via a communications protocol over a data network, to the warehouse management system, based on said comparing.

19. The non-transitory computer-readable medium storing instructions that perform the operations of claim 18, wherein said comparing the serving days of the selected item with said determined difference comprises:
   computing a difference between the expiration date associated with the selected lot, the predetermined date, and the serving days of the selected item; and
   comparing the computed difference to a predetermined threshold.

20. The non-transitory computer-readable medium storing instructions that perform the operations of claim 18, wherein said transmitting the message further comprises:
   if the computed difference is below the predetermined threshold, providing the instruction to prioritize shipment of the available lots of the selected item.

* * * * *